United States Patent Office 3,396,685
Patented Aug. 13, 1968

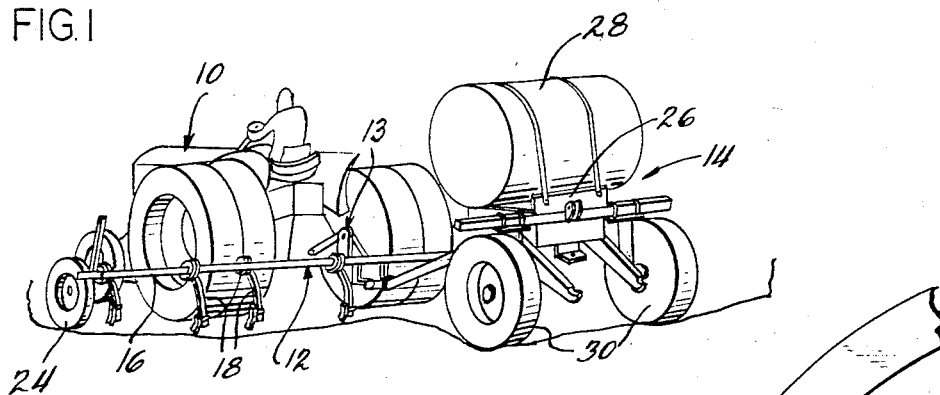
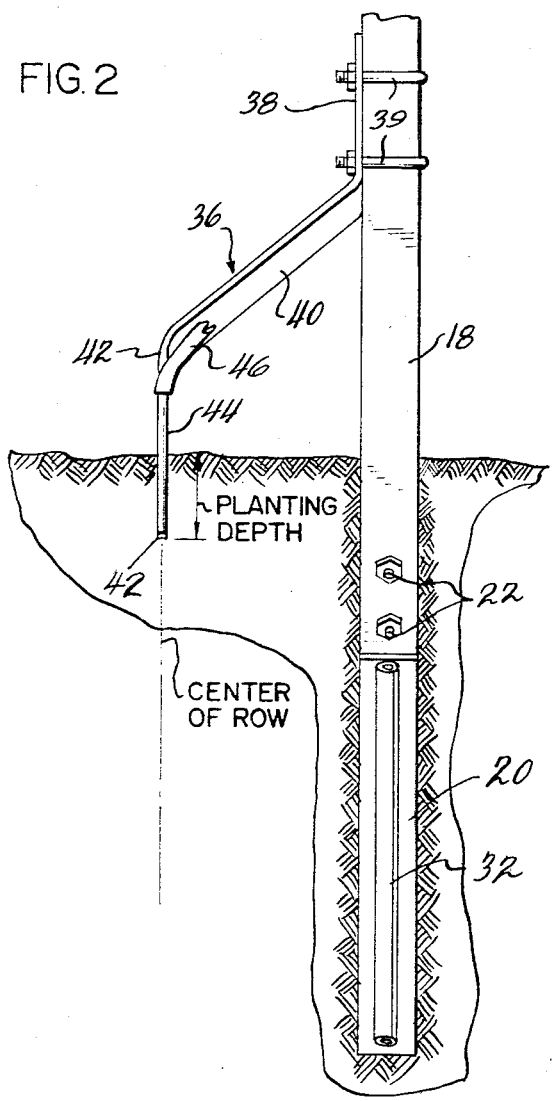
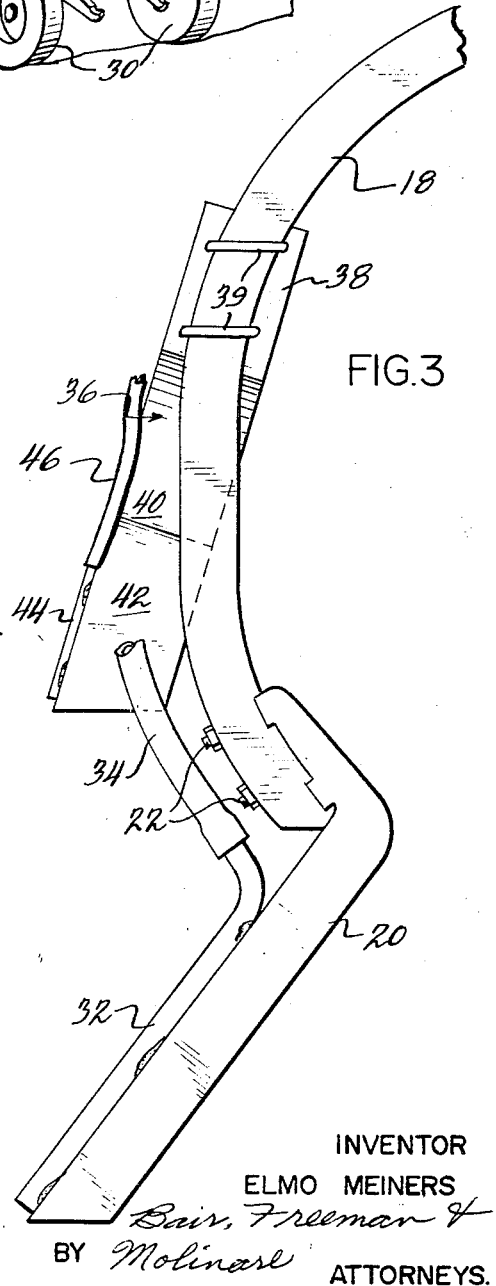

3,396,685
AUXILIARY FERTILIZER APPLICATOR
Elmo R. Meiners, Anchor, Ill., assignor to M & W Gear
Co., Gibson, Ill., a corporation of Illinois
Filed Sept. 16, 1966, Ser. No. 579,993
2 Claims. (Cl. 111—7)

ABSTRACT OF THE DISCLOSURE

An auxiliary fertilizer applicator for a conventional fertilizer applicator wherein the conventional applicator delivers liquid fertilizer at root depth between planted rows of corn or the like and the auxiliary applicator delivers fertilizer shallowly at planting depth along the center of the row.

---

This invention relates to an auxiliary shallow fertilizer applicator adapted to be used in conjunction with a deep-running fertilizer applicator of the type having a knife that passes through the ground at the side of a row of corn or the like to be planted.

One object of the invention is to provide an auxiliary applicator in the form of an auxiliary knife which can be attached to the side of the shank of an applicator implement which carries the deep-running applicator knife, my auxiliary applicator being so designed as to deliver additional liquid fertilizer in the center of the row and at planting depth so that this additional fertiilzer produces an initial boost to the corn when planted, causing it to grow more rapidly and its roots to likewise grow more rapidly so that they reach the fertilizer that was applied by the deep-running applicator more quickly, the end result being a much more rapid growth of the corn because of the use of my auxiliary fertilizer applicator.

Another object is to provide an auxiliary fertilizer applicator which may be readily attached and detached relative to the shank of a deep-running fertilizer applicator, and which can be secured to either the left side or the right side of the shank as desired or required.

A further object is to provide an auxiliary fertilizer applicator in the form of a support of strap-like metal formed to a shape which permits offset of an auxiliary fertilizer nozzle with respect to the shank of the applicacator implement and the deep-running applicator knife carried thereby, thus positioning the delivery end of the auxiliary fertilizer tube in the center of the row.

Still a further object is to provide an auxiliary fertilizer applicator knife which can be adjusted up or down on the shank so that the delivery end of its fertilizer tube is at planting depth when the applicator is in adjusted position for fertilizer applicator operation.

With these and other objects in view, my invention consists in the construction, arrangement and combination of the various parts of my auxiliary fertilizer applicator, whereby the objects above contemplated are attained, as hereinafter more fully set forth, pointed out in my claims and illustrated in detail on the accompanying drawing, wherein:

FIG. 1 is a perspective view of a tractor, a fertilizer applicator behind the tractor and a wheeled fertilizer tank unit trailing the fertilizer applicator.

FIG. 2 is a rear elevation of a deep-running fertilizer applicator both in relation to the ground and a row of corn or the like to be planted; and FIG. 3 is a side elevation of FIG. 2.

On the accompanying drawing I have used the reference numeral 10 to indicate in general a tractor. A fertilizer applicator apparatus comprising a fertilizer applicator unit 12 and a fertilizer tank unit 14 are illustrated. The applicator unit 12 includes one or more tool bars 16 provided with spring shanks 18 to the lower ends of which deep-running fertilizer applicator knives 20 are secured as by bolts 22. The tool bar 16 is supported by a 3-point hitch on the tractor 10 and indicated generally at 13. A pair of gauge wheels 24, one of which is shown in FIG. 1, the other one being hidden behind the unit 14, is provided on the frame of the unit 12. The unit 14 trails the unit 12 and comprises a tank support 26 on which a liquid fertilizer tank 28 is mounted, the tank support 26 being carried over the ground surface by wheels 30.

In the fertilization of ground for the growing of corn and the like, the knives 20 pass through the ground as shown in FIG. 2 and discharge liquid fertilizer (such as nitrogen or the like) at their lower ends. This is accomplished by the use of a delivery tube 32 welded to the knife and supplied through a hose 34 from the tank 28, a suitable control valve being provided to regulate the flow. The gauge wheels 24 prevent fertilizing too deeply. The object of fertilization in this manner is to provide fertile soil at a suitable depth to which the roots of the corn grow, thus securing maximum efficiency and economy in the use of liquid fertilizer.

I have found that auxiliary fertilization at planting depth and at the center of the row gives an initial fertilization to the planted corn making it take root sooner, and the roots, as well as the stalks, grow more rapidly, thus increasing the yield of the crop and maturing it faster.

Accordingly, I provide auxiliary fertilizer applicator knives shown generally at 36. Each knife comprises a support of strap-like metal having an upper attachment portion 38 and an outwardly and downwardly extending portion 40 terminating in a downwardly extending ground-entry portion 42. The portion 38 is adapted to be secured to the side of the spring shank 18 by U-bolts 39 and the ground entry portion 42 is adapted to enter the ground as depicted in FIG. 2 in alignment with the center of the row of corn and at planting depth as indicated in this figure. A fertilizer delivery tube 44 is welded to the rear edge of the auxiliary knife 36 as shown in FIG. 3 and a fertilizer supply hose 46 is connected therewith and extends from the tank 28.

While the tube 32 is delivering fertilizer for the roots of the crop, the tube 44 is delivering fertilizer directly in the row and at planting depth so as to give the additional boost to the germination and growth of the crop as hereinbefore referred to. The knife 36 may be mounted either to the left side of the shank 18 as shown in FIG. 2 or to the right side thereof as shown by dot-and-dash lines, depending on requirements for a particular fertilizing job.

FIG. 3 shows a back-swept main knife 20 and my auxiliary knife 36 also back swept. In some cases the knives 20 may be forwardly swept depending on conditions of soil, etc. From the foregoing specification it will be seen that I have provided a relatively simple and readily attachable shallow-running auxiliary fertilizer applicator for a deep-running fertilizer applicator apparatus and which is so disposed with respect to the planted crop that it accelerates growth and results in numerous advantages when used in conjunction with the usual type of fertilizer applicator apparatus.

Some changes may be made in the construction and arrangement of the parts of my auxiliary fertilizer applicator without departing from the real spirit and purpose of my invention, and it is my intention to cover by my claims any modified forms of structure or use of mechanical equivalents which may reasonably be included within their scope.

I claim as my invention:

1. In an auxiliary fertilizer applicator, the combination with a wheeled frame having a shank extending downwardly therefrom and provided with a deep-running fertilizer applicator knife adapted to pass through the ground at the side of a row of corn or the like to be planted and having means to deliver liquid fertilizer below the planting depth where it is reached by the roots of the corn as it grows; of an auxiliary shallow-running fertilizer applicator comprising an auxiliary fertilizer applicator knife, means to mount said auxiliary fertilizer applicator knife on said shank, said last mentioned knife having a portion offset from said shank for alignment with the center of the row, said portion being in the form of a flat blade, the plane of which is aligned with the direction of travel of said shank, means to deliver liquid fertilizer behind said blade at the lower rear corner thereof, the delivery end of said delivery means being thereby positioned to deliver liquid fertilizer at planting depth.

2. An auxiliary fertilizer applicator according to claim 1 wherein said auxiliary fertilizer applicator knife further comprises an upper portion adapted to be mounted on said shank, an outwardly and downwardly extending central portion, said fertilizer delivery tube being secured to said offset portion depending from said central portion and supported thereby.

References Cited

UNITED STATES PATENTS

| 334,106 | 1/1886 | Burrows | 172—201 |
| 2,874,656 | 2/1959 | Bennett | 111—7 |
| 3,148,642 | 9/1964 | Gould | 111—7 |

FOREIGN PATENTS

| 180,743 | 1/1887 | France. |
| 127,495 | 1960 | U.S.S.R. |

ROBERT E. BAGWILL, *Primary Examiner.*